United States Patent
Pinnow et al.

[15] 3,652,956
[45] Mar. 28, 1972

[54] COLOR VISUAL DISPLAY

[72] Inventors: Douglas Arthur Pinnow, Berkeley Heights; Le Grand Gerard Van Uitert, Morris Township, Morris County, both of N.J.

[73] Assignee: Bell Telephone Laboratories Incorporated, Murray Hill, N.J.

[22] Filed: Jan. 23, 1970

[21] Appl. No.: 5,324

Related U.S. Application Data

[63] Continuation-in-part of Ser. No. 827,624, May 26, 1969, abandoned.

[52] U.S. Cl. ............................ 332/7.51, 252/301.4, 250/199
[51] Int. Cl. ................................................................ H01s 3/10
[58] Field of Search ............... 332/7.51; 252/301.4; 250/199; 330/334, 100

[56] References Cited

UNITED STATES PATENTS

| 3,541,542 | 11/1970 | Duguay et al. | 340/324 |
| 3,453,604 | 7/1969 | Geusic et al. | 330/4.3 |
| 3,341,825 | 9/1967 | Schrieffer | 310/103 |
| 3,524,011 | 8/1970 | Korpel | 178/5.4 |
| 3,322,682 | 5/1967 | Thompson | 252/301.4 |
| 3,513,346 | 5/1970 | Awazu et al. | 313/108 |
| 3,488,503 | 1/1970 | Reich et al. | 250/199 |

FOREIGN PATENTS OR APPLICATIONS

| 1,564,271 | 4/1969 | France | 252/301.4 |

Primary Examiner—Rodney D. Bennett, Jr.
Assistant Examiner—N. Moskowitz
Attorney—R. J. Guenther and Edwin B. Cave

[57] ABSTRACT

A projection visual display system utilizes at least one laser output line in the blue portion of the spectrum together with a phosphor coating which emits at least one additional color. Means for selectively reflecting laser light on the one hand and absorbing it within the phosphor so as to produce phosphor emission on the other hand are described.

21 Claims, 7 Drawing Figures

INVENTORS D.A. PINNOW
L.G. VAN UITERT

COLOR VISUAL DISPLAY

RELATED U.S. APPLICATIONS

This application is a continuation-in-part of U.S. application Ser. No. 827,624 filed May 26, 1969.

BACKGROUND OF THE INVENTION

1. Field of the Invention

The invention is concerned with projection systems for visual color displays.

2. Description of the Prior Art

The relevant prior art is described in *IEEE Spectrum* for Dec. 1968 at page 39. In this review article, it is noted that "the promise of producing a cathode ray tube type of display with essentially unlimited screen size accounts for much of the current interest in laser displays...." The article then goes on to note that, while adequate modulation and scanning techniques are presently available, development awaits an adequate three-color source.

Probably the most promising color laser display system utilizes the blue (4,880 A.) and the green (5,145 A.) lines of the argon-ion laser. Means are available for effectively Q-switching these two emission wavelengths selectively, and presently available lasers operate at sufficiently high power levels to provide the brightness required for group viewing of projected images produced by reflection.

As also noted in the article, the obvious lacking in such a system is the absence of red emission. It is noted that an attempt has been made to provide red emission by use of a separate helium-neon laser operating at 6,328 A. Unfortunately, the reduced sensitivity of the eye to this long wavelength emission near the edge of the visible spectrum coupled with the comparatively low power levels available from this type of laser are such that the apparent brightness of the red is insufficient.

Another approach has involved the red emission line of the Krypton-ion laser at 6,471 A. This wavelength is still longer than that of the red emission line of the helium-neon laser where the eye is even less sensitive. Efficiencies to date are low and, in consequence, this approach has not been completely satisfactory.

SUMMARY OF THE INVENTION

A laser projection system utilizes a coherent light source and a light screen contributing at least two colors of light under the stimulus of the source. The screen includes a phosphor/s which may emit at least two colors or, alternatively, at least one color may be provided by reflection with at least a second being supplied by the phosphor. An exemplary three-color laser projection visual display system utilizes the 4,880 A. and 5,145 A. argon laser lines together with the red emission of a phosphor coating which is energized by 4,880 A., 4,145 A. or other argon laser irradiation. In this system and in most preferred embodiments, the phosphor depends for its operation on incorporation of active materials that fluoresce in the red. These may be dyes such as Rhodamine B or pigments made therefrom, inorganic compounds such as $Zn_{0.6}Cd_{0.4}$ activated by Cu, or $NaTb_{0.8}Eu_{0.2}W_2O_8$ that is sensitized by Tb and activated by Eu. In certain instances, $Eu^{2+}$–$Eu^{3+}$ transfer may also be used. In the exemplary embodiment, absorption of 4,880 A. radiation is accomplished by $Tb^{3+}$ and energy is transferred to the closely coupled $Eu^{3+}$ ion. Emission includes a strong peak near 6,100 A. together with contributions at about 5,900 A. and at longer wavelengths.

Selection as between emission to be reflected and that to be absorbed by the phosphor may be accomplished in different ways. One arrangement depends on selective deflection to specific phosphor-coated areas. Another depends upon selective passage and/or reflection of a particular polarization sense.

Appropriate phosphor compositions are described in the "Detailed Description." Exemplary materials are given above.

DETAILED DESCRIPTION

1. Drawing

Figure 1:
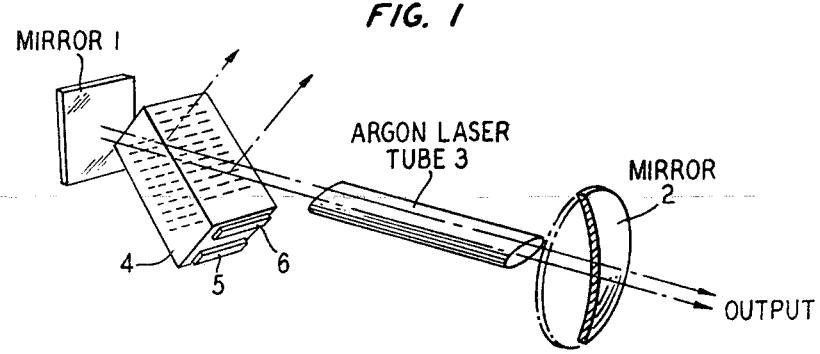
FIG. 1 is a perspective view of a portion of a system in accordance with the invention providing for a particular type of selective Q-switching to vary the two prominent emission wavelengths of, for example, an argon-ion laser.

Referring again to FIG. 1, the device depicted is a cavity consisting of totally reflecting, flat mirror 1 and partially transmitting, curved mirror 2. The cavity contains a laser tube 3, for example, argon-ion, which, as discussed, has two predominant emission lines, the first at 4,880 A. and the second at 5,145 A. Selective Q-switching is accomplished by means of acousto-optic Bragg deflector element 4 which is provided with two separate transducers 5 and 6. These transducers, powered by means not shown, may, for example, be piezoelectric or magnetostrictive elements. The two transducers, 5 and 6, are biased with r.f. energy at such frequencies as to result in the launching of elastic waves, the first of which transducer 5 produces diffraction primarily of the 5,145 A. green emission while the second, element 6, is driven at such frequency as to result in the launching of an elastic wave which interacts primarily with the 4,880 A. blue emission. The transducers 5 and 6 are so spaced physically that the resulting elastic waves follow substantially independent paths through element 4. Since the amount of either beam diffracted is proportional to the amplitude of the related elastic wave, varying amounts of either beam may be independently scattered out of the laser cavity so producing an effective loss for the concerned emission and thereby decreasing its intensity.

FIG. 1, like the other included figures, is illustrative only. The argon laser 3 and the acousto-optic Bragg deflector 4 are both so arranged as to present Brewster's angle faces to the laser beams. Losses are further reduced when Bragg deflectors are included in a single body of appropriate material (such as alpha-iodic acid or lead molybdate). Alternative arrangements may make use of separate deflectors or may utilize a deflector which is itself mirrored at the surface furthest removed from the laser tube so as to serve the function of mirror 1.

Figure 2:
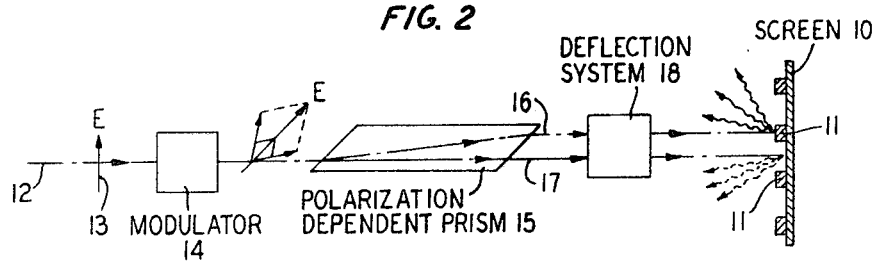
FIG. 2 is a diagrammatic view of a system in accordance with the invention including a detailed view showing a method of selection between energizing emission for producing phosphor secondary emission and emission to be reflected.

FIG. 2 depicts a possible arrangement for that portion of the system following a laser cavity such as that of FIG. 1. This arrangement is representative of a particular system for separating the laser beam into its two functional portions. The first of these portions 17 is directly reflected at its original wavelength and so makes a blue and/or green contribution to the image. The second portion 16 is, at least in part, absorbed by the phosphor material so as to result in secondary red emission.

The arrangement depicted in FIG. 2 makes use of a projection screen 10 which is selectively coated with phosphor material at regions 11. For the arrangement described, regions 11 may define a series of equidistant horizontal bands. In an optimum system, the interval between bands 11 is equal to the width of a resolvable line characteristic of a particular deflection system. In an illustration which treats only the 4,880 A. beam 12, the phosphor is not energized by 5,145 A. light. As depicted, the polarization state of beam 12 is such that the E vector 13 is vertical (this polarization sense may result from the presence of Brewster's faces within the laser cavity). Beam 12 is first passed through a modulator 14, for example, an electro-optic modulator of $LiTaO_3$ or $Ba_2NaNb_5O_{15}$ provided with electrodes and energizing source not shown to produce extreme 90° rotation or intermediate elliptical polarization. Passage through calcite or other polarization-dependent prism 15 results in exiting beams 16 and 17, relative positions and intensities of which depend on the magnitude of the relative phase shift of the ordinary and extraordinary rays produced by modulator 14. Beams 16 and 17 then pass through a deflection system 18 designed to scan screen 10 with beams 16 and 17 in such sequence and over such area as is required. Deflection system 18 may, for example, consist of two separate orthogonal acoustically driven Bragg diffraction elements or may depend upon mechanical scanning as by the use of rotating mirrors. The order of the elements is not significant and, in the alternate arrangement, the light beam 12 passes through the deflection system 18 before passing through the polarization-dependent prism 15.

In the system shown, the deflection system is so arranged as to result in a series of regularly spaced horizontal raster lines such as are utilized in commercial television. The effect of the calcite prism 15 (or other polarization sensitive deflection means) is to split each raster line into two parallel lines each corresponding with one of the two orthogonal polarizations of the beam (beams 16 and 17). The stripping 11 is such that one of the two split beams, for example, that having a vertical E vector (beam 16), is deflected so as to be in registry with a strip. This portion of the radiation is converted to red by the phosphor. The other polarization (E vector horizontal-beam 17) is emitted from the prism 15 displaced so as to be made incident on the screen on an interband interval (an uncoated portion). This portion of the radiation is reflected without change in frequency and so makes its own contribution to the image. Since electro-optic modulator 14 is so designed as to transmit either polarization or any mixture of the two polarizations, the relative amounts of red light to blue or green emitted from the screen 10 may be varied over a complete range.

The fact that all real materials, for example, of which elements 14 and 15 as well as those of system 18 are composed, are dispersive (so producing somewhat different effects on the two laser wavelengths) results in a minor complication which requires correction. All such minor corrections may be accomplished by means of suitable circuitry associated with, for example, the selective Q-switching apparatus shown in FIG. 1.

Figure 3:
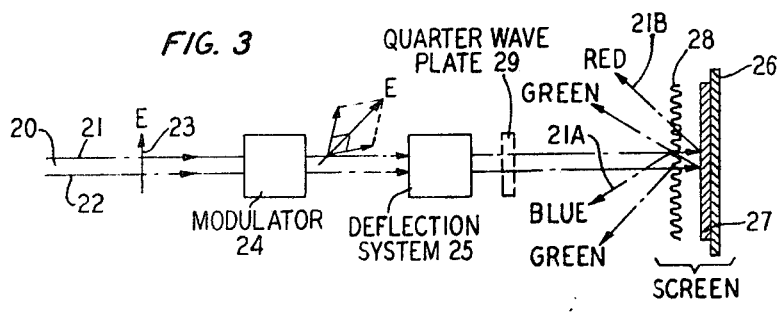
FIG. 3 is a diagrammatic figure of an invention system showing an alternative mechanism for performing the function of the apparatus of FIG. 2.

The arrangement of FIG. 2 has the drawback of requiring critical alignment of the screen relative to the rest of the system. The arrangement discussed in terms of the same laser source and shown in FIG. 3 overcomes this problem. In accordance with this arrangement, beam 20, composed of 4,880 A. portion 21 and 5,145 A. portion 22 having a polarization represented as having its electric vector 23 vertical, is passed through modulator 24 which is provided with electrodes and energizing source, not shown, to produce a polarization shift in accordance with a video signal. A deflection system 25 again serves to produce a raster or to otherwise scan the desired portion of screen 26. In this modification, the entirety of screen 26 is coated with phosphor 27 which is energized by selectively polarized radiation to produce red emission. Separation of that portion of the light to be reflected and that portion to be converted is, again, based on polarization sense.

This separation is accomplished by polarizing element 28 which may be a layer of liquid crystals. Such arrangement permits the transmission of one polarization and the reflection of the other. Similarly, such crystals in a solidified plastic matrix or oriented sheets of tourmaline or similar polarizing crystals or even commercial polaroid may be used.

The preferred form of polarizing element 28 is an oriented layer of cholesteric liquid crystals or similar material which is not dichroic, as are tourmaline and polaroid. Such liquid crystals are known to scatter rather than primarily absorb (dichroism) the untransmitted polarization as discussed by G. W. Gray *Molecular Structure and the Properties of Liquid Crystals*, (Academic Press, New York, 1962) pp. 47 and 48. Since these liquid crystals selectively scatter circularly rather than linearly polarized light, it is necessary to add a quarter wave plate 29 to the optical system. This plate simply converts vertically polarized incident light into left circularly polarized light, and horizontally polarized incident light into right circularly polarized light. The liquid crystals are termed laevo-rotatory or dextro-rotatory depending on whether they selectively scatter left or right circularly polarized light. Both forms are known to exist. Because these liquid crystals have been found to efficiently scatter only a very narrow range of optical wavelengths (which may be varied by modifying their structure), it may be desirable to make element 28 out of two adjacent liquid crystal layers having structures that will optimize the selective polarization scattering at each of the two incident laser wavelengths (e.g. 4,880 A. and 5,145 A. for the argon laser).

The transmitter portion is the only part of the incident radiation striking phosphor layer 27 and it alone, therefore, results in red emission. In the illustration, blue beam 21 is shown broken up into reflected blue beam 21A and as a transmitted beam resulting in red beam 21B. The green beam 22 is also phase shifted so as to result in split portions, one beam transmitted through and the other reflected by layer 28 producing effects similar to those described for the blue beam in most instances. However, when Tb sensitized-Eu activated phosphors are used, both portions make a green contribution since this wavelength does not then significantly excite the phosphor layer 27 (see FIG. 4).

Figure 4:
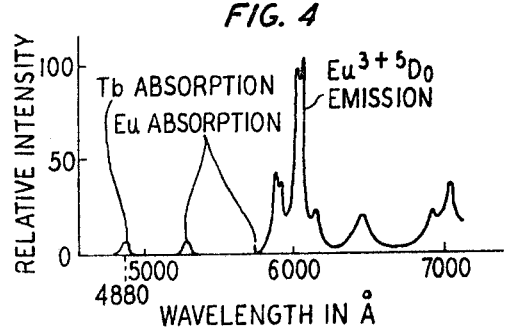
FIG. 4, on ordinate units of relative absorption and emission intensity, and abscissa units of wavelength in angstrom units, is a plot depicting the relevant portions of the absorption and emission spectra of a phosphor suitable for red emission in accordance with the invention.

FIG. 4 depicts a typical absorption and emission spectrum for the $Tb^{3+}-Eu^{3+}$ phosphor indicated above. Ordinate units are in terms of relative intensity while abscissa units are wavelengths in angstrom units. There exists a fortunate match between the 4,880 A. emission of the argon-ion laser and the absorption of the $^5D_4$ manifold of $Tb^{3+}$. For sufficiently high terbium concentration, there is efficient transfer to $Eu^{3+}$. Transfer is initially to a $^5D_1$ manifold of $Eu^{3+}$ and thence to the $^5D_0$ manifold also by radiationless transitions. The dominant europium radiation from this level is to the $^7F_2$ manifold and is over a wavelength range peaking at about 6,140 A. Suitable compositions are discussed in the section which follows.

Figure 5:
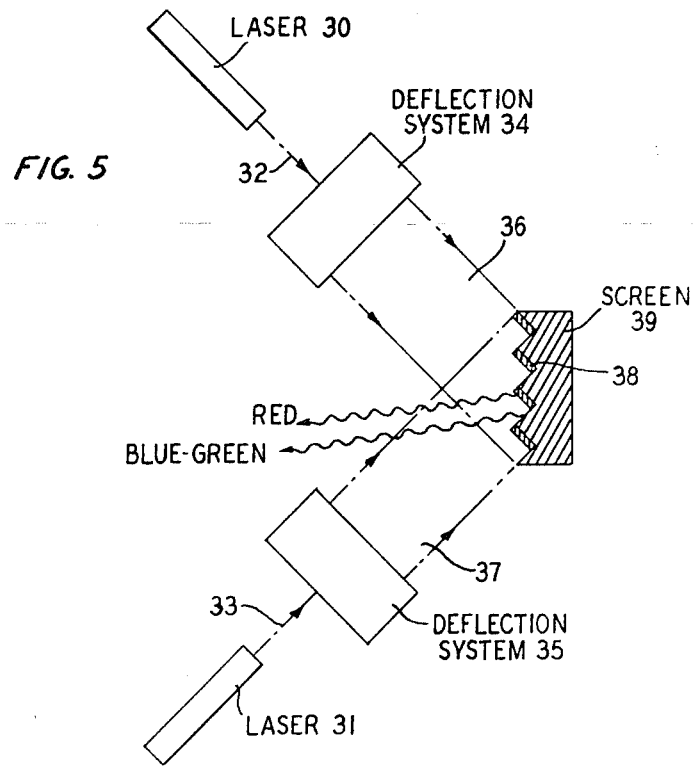
FIG. 5 is a diagrammatic view of an alternate system which uses two similar laser sources, one of which selectively illuminates a red emitting phosphor.

FIG. 5 shows a display system which uses two lasers, 30 and 31, both of which are similar to the one shown in detail in FIG. 1. The outputs, beams 32 and 33, of these lasers are separately modulated by means such as discussed above and shown in FIG. 1. Beam 32 consists of modulated blue-green light which is deflected by element 34. The output of this deflector is beam 36 which is incident on a corrugated viewing screen 38 only in regions where it can be directly scattered. Beam 33 is also blue-green but it is modulated with red signal information. After deflection by 35, it emerges as beam 37 and is incident upon screen 38 only in regions where there is a phosphor 39 that converts it into a red color. The angles at which beams 36 and 37 are incident upon the screen are chosen to insure that the shadow of the corrugated surface effectively masks the red phosphor 39 from beam 36 while permitting all of beam 37 to fall upon this phosphor.

The arrangement in FIG. 5 is useful when more than one laser is necessary to provide the desired level of screen illumination. If this illumination can be provided with a single laser, the arrangement shown in FIG. 6 can be used to advantage since only one beam scanning deflector 41 is necessary. In this arrangement, beam 40 is a blue output of a laser, such as the 4,416 A. line of a cadmium laser. The intensity of this beam can be modulated by an acousto-optic device located within the laser cavity similar to that shown in FIG. 1 or by some external means. Beam 40 is then scanned by a deflection system 41 whose output is beam 42. This beam is then split into three distinct outputs 44, 45, and 46 traveling in different directions by deflector 43. The relative intensities of these three outputs are varied in accordance with the desired intensities of the blue, green, and red primaries. The splitting can be accomplished either acousto-optically or electro-optically. Mirrors 47 and 48 are used to redirect beams 44 and 46 to converge with beam 45 at the viewing screen 50. This screen is covered with an array of transparent cylindrical lenses 49 which serve to focus beam 44 only to a stripe coated with blue-to-green converting phosphor 51, beam 45 to a stripe of blue-to-red converting phosphor 52, and beam 46 to a stripe 53 which directly scatters the blue beam.

Figure 6:
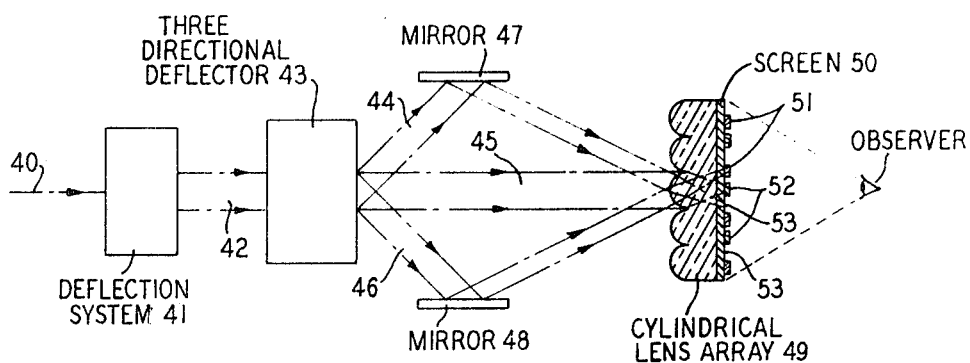
FIG. 6 is a diagrammatic view of another alternate system which uses two different phosphors, one emitting green, the other emitting red.

Alternatively, stripe 53 may be a phosphor which converts the coherent blue beam into an incoherent blue color which eliminates speckle associated with direct scattering. Screen 50 can be viewed from a back-lighted position as shown in FIG. 6. The advantage of this system over the one shown in FIG. 2 is that color registration does not depend on critical alignment of the projection system with respect to the screen. The only critical alignment necessary is that of the cylindrical lenses relative to the phosphor stripes. This can be permanently established during screen fabrication.

Figure 7:
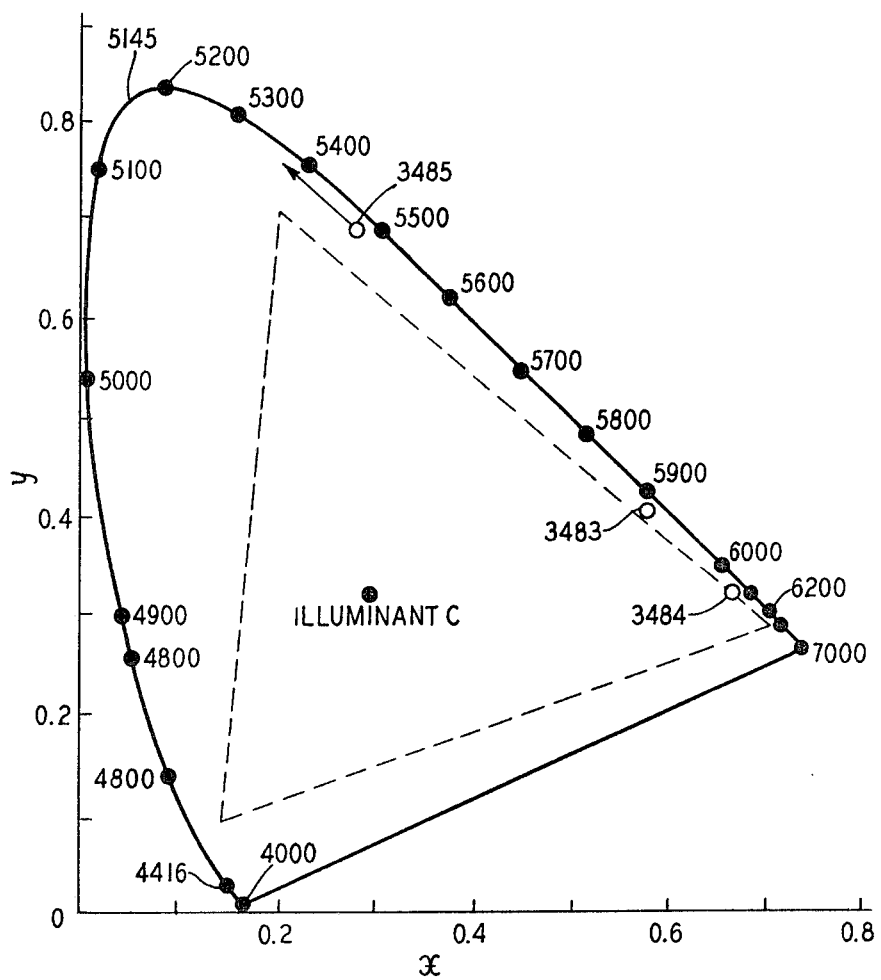
FIG. 7 is a CIE chromaticity diagram showing the coordinates of several particularly useful phosphor emissions.

FIG. 7 is the internationally accepted CIE chromaticity diagram (see *Applied Optics*, "A Guide to Modern Optical System Design" Ch. 1 by L. Levi (J. Wiley & Sons, 1968) which can be used as a guide in assessing the color quality of a display system. In this diagram, the saturated (monochromatic) colors are located on the perimeter of the horseshoe-shaped plot, while colors of decreasing saturation approach illuminant C which is a white color equivalent to average daylight illumination. Every real color, regardless of its spectral complexity, can be represented by a single point on or within this plot. A straight line connecting any two points (primaries) represents the locus of possible colors that can be achieved by blending them in varying proportions. Similarly, the gamut of colors possible by the combination of more than two primaries are those which fall within the polygon determined by straight lines which connect adjacent primaries. As an example, the dotted triangle encloses the color gamut of a shadow mask color CRT. For comparison, there are shown the major cadmium and argon laser lines at 4,416 A., 4,880 A., and 5,145 A. as well as the emissions of the YAG:Ce phosphor and the three organic dye phosphors designated 3,485 which is related to 4-amino, 1, 8-napthal p-xenylimide and 3,483 and 3,484 which are Rhodamine based pigments. The arrow on the 3,485 dye emission shows the effect of adding phthalocyanine toner, which selectively absorbs the longer wavelength yellow and red portion of the emission to produce a more vivid green. It can be seen that the combination of light from either of these blue laser sources and emission from the 3,483 and 3,485 phosphors results in a color gamut similar to that of the color CRT.

A black and white display can be achieved by scanning a monochromatic laser beam on a viewing screen that is coated with an appropriate blend of phosphors and direct scattering materials such as powdered MgO or talc. For example, a combination of scattered light from a blue argon-ion laser beam (4,880 A.) and blue to red converted light from either Rhodamine dye phosphors 3,483 or 3,484 can produce a white appearance since a straight line connecting these primaries on the chromaticity diagram passes very near to illuminant C.

A combination of more than two primaries can also be used to produce white. As an example, a Cd-He laser beam which illuminates a correctly proportioned mixture of MgO and dye phosphors 3,484 and 3,485 can be used to achieve a white appearance. Alternatively, the MgO may be replaced by material containing pyrelene (a blue-to-blue converting phosphor to completely eliminate speckle).

Regardless of how many phosphors are used, it is apparent from the chromaticity diagram that a necessary condition for achieving a true white is that the illuminating laser beam have a wavelength of approximately 4,950 A. or shorter. Otherwise it would be impossible to include illuminant C within a polygon whose primaries are the source and any combination of longer wavelengths that can be achieved by conversion. Fortunately, sources such as the argon-ion laser satisfy this necessary condition.

2. Phosphor Composition

Phosphor compositions suitable for the purpose of the invention must fluoresce in the long wavelength portion of the visible spectrum. These include dyes; pigments made from dyes, for example, by adsorption of the dispersed dye on colloidal particles; inorganic phosphors such as $Zn_{0.6}Cd_{0.4}S:Cu$; and phosphors that are activated by $Eu^{3+}$, $Sm^{3+}$ or in certain instances $Er^{3+}$ or $Pr^{3+}$. The dyes that are of interest include Rhodamine-B, Rhodamine-6G, Magdala red, or naphthalene red, safranine and methylene blue. The properties of such compounds are described in the "Merk Index" by E. G. Bobalek in *Organic Protective Coatings*, edited by William Von Fisher and E. G. Bobalek, Rheinhold Publishing Co. (1953) and in *Fluorescence and phosphorescence* by P. Pringsheim, Interscience (1949) as well as in Trade Catalogs of Aldrich Chemical Company, Allied Chemical Company and other chemical houses. The inorganic phosphors that are of interest include the (Zn, Cd, Sr) (S, Se):(Cu, Ag, Mn) and $Mg_2TiO_4$:Mn systems described in *Introduction to the Luminescence of Solids* by H. Leverenz, Wiky (1950) and $Tb^{3+}$ sensitized–$Eu^{3+}$ activated tungstates and molybdates described by L. G. Van Uitert and R. R. Soden, *Journal of Applied Physics*, Vol. 36, pp. 1289–1293 (1962) as well as similar phosphates, borates, aluminates, gallates, indates, silicates and germanates.

A broad range of inclusion of Tb and Eu elements is in terms of A-sites where A-sites are defined as the sites in which rare earth ions may be accommodated. In these terms, terbium concentration may range from 5 percent to about 99.9 percent occupancy of such sites while from 0.1 to 50 percent of the same sites are occupied by europium. The lower limits are occasioned by the observation that lesser amounts of either ion result in a red intensity which is considered inadequate for most purposes. The maxima result from the observation that exceeding either the value for Tb or Eu results in little further enhancement in intensity. In the instance of europium, large amounts may result in some concentration quenching for certain structures. In other terms, it is convenient to express the range of terbium europium as the ion percent of R ions in the composition. R ions are defined as Tb, Eu, Bi, La, Ce, Gd, Lu, Y, In, and Sc. While most phosphors utilized for these purposes are oxidic, other anions may be present. Examples are the halides, F, Cl, Br, I and the chalcogenides, S, Se, Te.

The preferred class of Tb-Eu phosphor materials is of the form $M^{1+}_{0.5-x}R_{0.5+x/3}M^{6+}O_4$ where $M^{6+}$ is W or Mo, $M^{1+}$ is Li or Na, R is as above defined and where $x$ is from zero to 0.5. Exemplary materials within this class are $Li_{0.5}Tb_{0.4}Eu_{0.1}WO_4$ and $Gd_{0.283}Tb_{0.5}Eu_{0.1}MoO_4$ and a broader class of appropriate compositions may be represented by the compounds $M^{1+}_{1/2}R_{1/2}M^{6+}_4$, $M^{2+}_{1-2x}M^{1+}_xR_xM^{6+}O_4$, $R_{2/3}M^{6+}_4$, $R_3M^{3+}_5O_{12}$ and $RM^{3+}O_3$ where $M^{6+}$ is W or Mo, $M^{1+}$ is Li, Na, K, Rb, Cs and $M^{3+}$ is Al or Ga. Still a broader class may be defined as including the additional compounds $RM^{5+}O_4$, $R_2M^{4+}O_5$, $M^{2+}R_{1/2}M^{5+}_{1/23}$, $R_2M^{4+}_2O_7$, $M^{1+}RO_2$, $RZ_3$, $ROZ$, $R_3OZ_7$, $R_2O_3$, $R_2O_2Q$ and $R_2Q_3$. Substitutions of R ions into $M^{2+}O$ and $M^{2+}Q$ may be utilized. In all of the above, the R ions are as defined and the additional cations are as set forth $M^{6+}$ is W, Mo, S, Se, Te; $M^{5+}$ is Nb, Ta, V, P, As, Sb; $M^{4+}$ is Si, Ge, Ti, Zr, Hf, Sn; $M^{3+}$ is B, Al, Ga, Sc, In, Bi; $M^{2+}$ is Pb, Ba, Sr, Ca, Cd; $M^{1+}$ is Li, Na, K, Rb, Cs, Tl, and Q is S, Se, Te. Z is F, Cl, Br or I.

What is claimed is:

1. Visual display including at least one source of coherent electromagnetic radiation emitting at least one wavelength, a screen provided with means for emitting at least two different visible wavelengths of light, means for displacing emission from a said incident source so as to make its output incident upon different portions of the said screen, and means for altering the relative amounts of the said two wavelengths emitted from the said screen in given time intervals, characterized in that emission of at least one of said wavelengths is produced by a phosphor portion of the said screen, in which radiation from the said laser is polarized, in which modulation means is provided for modulating such polarization, and in which the said modulated radiation is made incident on a selected means which transmits primarily only one polarized portion of the said radiation to a phosphor portion of said screen while reflecting at least a portion of the remainder of the modulated radiation.

2. System of claim 1 in which at least one of the said wavelengths emitted by the said screen is reflected emission from the said coherent light source.

3. A system of claim 1 in which the said screen includes a phosphor portion which consists essentially of an organic colorant.

4. System of claim 3 in which the said colorant contains at least one fluorescent organic component selected from the group consisting of coumarin, xanthene, acridine, Rhodamine naphthalimide, azine, thiazine, type compounds.

5. System of claim 4 in which the said component is selected from the group consisting of pyrelene, 7-diethylamino 4-methyl coumarin, Rhodamine B, Rhodamine 6G, acridine, 4-amino 1,8-naphthal p-xenylimide.

6. System of claim 1 in which the means for selecting is displacement sensitive and in which only selected portions of the said screen comprise a phosphor emitting at one of the said wavelengths.

7. System of claim 1 in which the said selection means is polarization sensitive.

8. System of claim 7 in which the said polarization is essentially plane polarization.

9. System of claim 8 in which the screen includes portions which are plane polarizing and in which some of the said plane-polarizing portions overlay at least some phosphor portions.

10. System of claim 9 in which the emission from said coherent light source is plane polarized prior to becoming incident upon the said screen.

11. System of claim 8 in which the said polarization is circular polarization.

12. System of claim 11 in which selection results from use of a screen surface portion consisting essentially of liquid crystals.

13. System of claim 12 in which the said liquid crystals are cholestoric.

14. System of claim 12 in which the emission from the said coherent light source is circularly polarized.

15. System of claim 1 in which the said coherent light source includes a cadmium-helium laser emitting at 4,416 A.

16. System of claim 1 includes at least one acousto-optic element.

17. System of claim 1 in which said phosphor consists essentially of at least one composition selected from the group consisting of $M^{1+}_{1/2}R_{1/2}M^{6+}O_4$, $M^{2+}_{1-2x}M^{1+}_xR_xM^{6+}O_4$, $R_{2/3}M^{6+}O_4R_3M^{3+}_5O_{12}$, $RM^{3+}O_3$, $M^{1+}RO_2$, $M^{2+}R_{1/2}M^{5+}_{1/2}O_3$, $RM^{5+}O_4$, $R_2M^{4+}O_5$, $R_2M^{4+}_2O_7$, $RZ_3$, $ROZ$, $R_3OZ_7$, $R_2O_3$, $R_2O_2Q$, $R_2Q_3$, and substitutions of R or R plus $M^{1+}$ into $M^{2+}O$ or $M^{2+}Q$; in which $M^{6+}$ is W, Mo, S, Se, Te, $M^{5+}$ is Nb, Ta, V, P, As, Sb, $M^{4+}$ is Si, Ge, Ti, Zr, Hf, Sn, $M^{3+}$ is B, Al, Ga, Sc, In, Bi, $M^{2+}$ is Pb, Ba, Sr, Ca, Cd, $M^{1+}$ is Li, Na, K, Rb, Cs, Tl, Z is F, Cl, Br, I, and Q is S, Se, Te; in which R is Tb+Eu with or without Bi, La, Ce, Gd, Lu, Y, In, Sc; and in which from 5 to 99.9 ion percent of the R ions is Tb and from 0.1 to 50 ion percent of the R ions is Er.

18. System of claim 17 in which said third means consists essentially of $M^{1+}_{0.5-x}R_{0.5+x/3}M^{6+}O_4$ in which $M^{1+}$ is Li and Na, $M^{6+}$ is W and Mo, and R contains Tb+Eu.

19. System of claim 18 in which the said third means consists essentially of $Li_{0.5}Tb_{0.5-x}Eu_xWO_4$.

20. Visual display including at least one source of coherent electromagnetic radiation emitting at at least one wavelength, a screen provided with means for emitting at least two different visible wavelengths of light, means for displacing emission from a said coherent source so as to make its output incident upon different portions of the said screen, and means for altering the relative amounts of the said two wavelengths emitted from the said screen in given time intervals, characterized in that emission of at least one of the said wavelengths is produced by a phosphor portion of the said screen, in which the said coherent light source includes an argon-ion laser which emits at 4,880 A., in which the said laser which additionally emits at a wavelength of about 5,145 A., in which the said screen is adapted for scattering at least a portion of the radiation produced by the said laser, in which the said screen includes phosphorescent portions for converting at least a portion of radiation at the said wavelength of about 4,880 A. to red light, in which the said portions form regularly spaced parallel bands, and in which the said 4,880 A. radiation from the said laser is polarized, in which the polarization is modulated by a polarization means, and in which the so modulated radiation is transmitted through a deflection means which is polarization independent.

21. System of claim 20 in which the said modulating means is an electro-optic modulator.

* * * * *

UNITED STATES PATENT OFFICE
CERTIFICATE OF CORRECTION

Patent No. 3,652,956              Dated March 28, 1972

Inventor(s) D. A. Pinnow and L. G. Van Uitert

It is certified that error appears in the above-identified patent and that said Letters Patent are hereby corrected as shown below:

Column 1, line 60, change "$Zn_{0.6}Cd_{0.4}$" to read --$Zn_{0.6}Cd_{0.4}S$--.

Column 4, line 26, change "transmitter" to read --transmitted--.

Column 6, line 61, change "$_{1/2}M^{6+}_{4}$" to read --$_{1/2}M^{6+}O_4$--;

change "$R_{2/3}M^{6+}_{4}$" to --$R_{2/3}M^{6+}O_4$--;

line 66, change "$M^{5+}_{1/2 3}$" to read --$M^{5+}_{1/2}O_3$--.

Signed and sealed this 1st day of August 1972.

(SEAL)
Attest:

EDWARD M. FLETCHER, JR.          ROBERT GOTTSCHALK
Attesting Officer                 Commissioner of Patents